US012736040B2

(12) United States Patent
Fu et al.

(10) Patent No.: US 12,736,040 B2
(45) Date of Patent: Sep. 15, 2026

(54) TRANSMISSION STRUCTURE WITH LIMITING RAIL AND AIR COMPRESSOR

(71) Applicant: ZHEJIANG QIANJI INTELLIGENT TECHNOLOGY CO., LTD., Jinhua (CN)

(72) Inventors: Keke Fu, Jinhua (CN); Jin Li, Jinhua (CN)

(73) Assignee: ZHEJIANG QIANJI INTELLIGENT TECHNOLOGY CO., LTD., Jinhua (CN)

( * ) Notice: Subject to any disclaimer, the term of this patent is extended or adjusted under 35 U.S.C. 154(b) by 266 days.

(21) Appl. No.: 18/685,720

(22) PCT Filed: Jul. 15, 2022

(86) PCT No.: PCT/CN2022/106072

§ 371 (c)(1),
(2) Date: Feb. 22, 2024

(87) PCT Pub. No.: WO2023/024757

PCT Pub. Date: Mar. 2, 2023

(65) Prior Publication Data

US 2024/0360821 A1 Oct. 31, 2024

(30) Foreign Application Priority Data

Aug. 24, 2021 (CN) ......................... 202110976599.2

(51) Int. Cl.
*F04B 39/00* (2006.01)
*F04B 9/04* (2006.01)
(Continued)

(52) U.S. Cl.
CPC .............. *F04B 39/00* (2013.01); *F04B 9/047* (2013.01); *F16H 25/12* (2013.01); *F04B 27/02* (2013.01)

(58) Field of Classification Search
CPC .......... F04B 39/00; F04B 9/047; F04B 27/02; F16H 25/12
See application file for complete search history.

(56) References Cited

U.S. PATENT DOCUMENTS 1,367,827 A * 2/1921 Noble ..................... F04B 9/047 74/57
7,198,074 B2 * 4/2007 Lemme ................. B65B 31/047 141/192

FOREIGN PATENT DOCUMENTS

CN 2467819 Y 12/2001
CN 1779297 A 5/2006

(Continued)

OTHER PUBLICATIONS

International Search Report and Written Opinion (with English translation) received in corresponding Application No. PCT/CN2022/106072, dated Oct. 12, 2022, 17 pages.

(Continued)

*Primary Examiner* — Nathan C Zollinger
(74) *Attorney, Agent, or Firm* — Dority & Manning, PA

(57) ABSTRACT

In one aspect, a transmission structure transmission structure comprises a rotating shaft and a transmission body, wherein one end of the rotating shaft is provided with a limiting track, and the other end of the rotating shaft is used for being connected to a driving mechanism; and one end of the transmission body movably matches the limiting track, so that the transmission body reciprocates along an axis of the rotating shaft under the limiting of the limiting track when the rotating shaft rotates, and the other end of the transmission body is used for being connected to an apparatus needing to do linear reciprocating work.

7 Claims, 6 Drawing Sheets

(51) Int. Cl.

| | |
|---|---|
| ***F16H 25/12*** | (2006.01) |
| *F04B 27/02* | (2006.01) |

(56) References Cited

FOREIGN PATENT DOCUMENTS

| | | | | | |
|---|---|---|---|---|---|
| CN | 101644245 | A | | 2/2010 | |
| CN | 101725505 | A | | 6/2010 | |
| CN | 202165260 | U | | 3/2012 | |
| CN | 106593801 | A | | 4/2017 | |
| CN | 106704136 | A | | 5/2017 | |
| CN | 107061243 | A | * | 8/2017 | ............. F04B 35/01 |
| CN | 206571637 | U | | 10/2017 | |
| CN | 107709770 | A | | 2/2018 | |
| CN | 111473203 | A | | 7/2020 | |
| CN | 112648167 | A | | 4/2021 | |
| CN | 113374683 | A | | 9/2021 | |
| CN | 113719439 | A | | 11/2021 | |
| DE | 2213298 | A1 | * | 9/1973 | |
| JP | H 08229475 | A | | 9/1996 | |
| JP | H0996275 | A | * | 4/1997 | |
| JP | 2002339861 | A | | 11/2002 | |
| KR | 20060119724 | A | | 11/2006 | |
| KR | 20180120944 | A | * | 11/2018 | ............ E21B 43/12 |
| WO | WO 2016201529 | A1 | | 12/2016 | |
| WO | WO 2016208429 | A1 | | 12/2016 | |

OTHER PUBLICATIONS

First Office Action (with English translation) received in corresponding Application No. CN 202110976599.2, dated Nov. 14, 2022, 19 pages.

Second Office Action (with English translation) received in corresponding Application No. CN 202110976599.2, dated Jul. 18, 2023, 14 pages.

Third Office Action (with English translation) received in corresponding Application No. CN 202110976599.2, dated Jul. 15, 2024, 17 pages.

* cited by examiner

TRANSMISSION STRUCTURE WITH LIMITING RAIL AND AIR COMPRESSOR

CROSS-REFERENCE TO RELATED APPLICATIONS

This application is the national phase under 35 U.S.C. § 371 of PCT International Application No. PCT/CN 2022/106072, which has an international filing date of Jul. 15, 2022 and claims priority to Chinese patent application No. 2021109765992, filed on Aug. 24, 2021, the contents of both of which are hereby incorporated by reference in their entirety for all purposes.

TECHNICAL FIELD

The present disclosure relates to the technical field of mechanical transmission, and in particular, to a transmission structure, a transmission connection mechanism, and an air compressor.

BACKGROUND

An oil-free air compressor is a miniature reciprocating piston compressor. When the motor drives the crankshaft of the compressor to rotate, the piston, which is self-lubricating without adding any lubricant, reciprocates through the transmission of the connecting rod, and the working volume defined by the inner wall of the cylinder, the cylinder head, and the top surface of the piston would change periodically. Due to the eccentric force of the crankshaft and the connecting rod and the eccentric angle of the swing arm, the transmission efficiency is not high, the overall work efficiency is low, and the loss is large.

SUMMARY

1. The Technical Problem to be Solved

Aiming at the technical problem of eccentric angle in a swing arm of an oil-free air compressor, the present disclosure provides a transmission structure, a transmission connection mechanism, and an air compressor, which are beneficial to reduce deflection force, reduce power loss and improve transmission efficiency.

2. Technical Schemes

In order to solve the above problem, the technical scheme provided by the present disclosure is: a transmission structure, including a rotating shaft and a transmission body. An end of the rotating shaft is provided with a limiting rail, and another end of the rotating shaft is configured to be connected to a driving mechanism. A first end of the transmission body movably cooperates with the limiting rail so that when the rotating shaft rotates, the transmission body reciprocates along an axis of the rotating shaft under limit of the limiting rail, and a second end of the transmission body is configured to be connected to a device that requires linear reciprocation to do work.

Optionally, the first end of the transmission body is symmetrically provided with transmission members. The limiting rail extends in a circumferential direction of the rotating shaft. The limiting rail extends reciprocally in an axial direction of the rotating shaft. The transmission members movably cooperate with the limiting rail.

Optionally, the transmission body includes a cavity through which the rotating shaft extends and a passage in which the transmission member is placed. The passage is in communication with the cavity. The transmission member is fit tightly into the passage. A top of the passage is covered by a fastener. The fastener includes a hoop body and a pressure plate connected to the hoop body. The hoop body is fit over an outer surface of the transmission body. The pressure plate covers the top of the passage.

Optionally, a guide assembly is further included. The guide assembly includes a first guide member and a second guide member in sliding or rolling fit with the first guide member. The first guide member is arranged parallel to the rotating shaft. The second guide member is arranged on the transmission body. The hoop body includes an engaging groove or an engaging hole cooperating with the second guide member.

Optionally, the first guide member and the second guide member are in sliding fit. The first guide member is a guide plate, a guide groove, or a guide tube. When the first guide member is a guide plate, the second guide member is a guide groove or guide tube that cooperates with the guide plate. When the second guide member is a guide plate, the first guide member is a guide groove or guide tube that cooperates with the guide plate.

Optionally, the first guide member and the second guide member are in rolling fit. The first guide member is a slide rail, and the second guide member is a ball that cooperates with the slide rail.

The present disclosure further discloses a transmission connection mechanism, which includes a mechanism body, a piston and the transmission structure as described above. The first guide member is arranged on the mechanism body. A first end of the piston is arranged inside the mechanism body, and a second end of the piston is connected to the transmission body, so that the transmission body drives the piston to perform linear reciprocating motion inside the mechanism body.

The present disclosure further discloses an air compressor, which includes a driving mechanism and the transmission connection mechanism as described above. One or more transmission connection mechanisms are provided. The driving mechanism drives one or more rotating shafts to rotate. The mechanism body is provided with a cavity, a first air passage, and a second air passage. The first air passage and the second air passage are in communication with the cavity. The second end of the piston is connected to the transmission body, and the first end of the piston is in sliding fit with the cavity, so that the piston draws air into the cavity from the first air passage, and discharges the air in the cavity via the second air passage.

Optionally, the piston is provided with a sealing ring fit over an out periphery of the piston. The sealing ring fits tightly against an inner wall of the cavity.

Optionally, the driving mechanism includes a reduction box and a driving member. The driving member is drivingly connected to the reduction box, and the reduction box is connected to the rotating shaft.

3. Beneficial Effects

Compared with the prior art, the technical scheme according to the present disclosure has the following beneficial effects:

(1) In the transmission structure proposed in the embodiments of the present disclosure, the driving mechanism drives the rotating shaft to rotate. When the rotating shaft rotates, the transmission body reciprocates along the axis of the rotating shaft under the limit of the limiting rail, so that the device connected to the transmission body reciprocates linearly to do work, which is beneficial to reduce deflection force, reduce power loss and improve transmission efficiency.

(2) In the transmission structure proposed in the embodiments of the present disclosure, the fasteners firmly fix the transmission members into the passage, ensuring that the transmission members drive the transmission body to perform reciprocating linear motion.

(3) In the transmission structure proposed in the embodiments of the present disclosure, the transmission body is in guiding fit with the first guide member by means of the second guide member, which avoids a large degree of trajectory deviation in the reciprocating motion of the transmission body, and is beneficial to improve the transmission efficiency of the transmission structure.

(4) In the air compressor proposed in the embodiments of the present disclosure, the driving mechanism drives the rotating shaft to rotate. When the rotating shaft rotates, the transmission body reciprocates along the axis of the rotating shaft under the limit of the limiting rail, so that the piston connected to the transmission body reciprocates linearly to do work, so that the piston draws air into the cavity from the first air passage and discharges the air in the cavity via the second air passage. There is no deflection force during the reciprocating process of the piston, and the piston does work back and forth in both directions, improving transmission efficiency. In addition, a plurality of bodies can reciprocate to do work along the axis of the rotating shaft at the same time, increasing the working efficiency of the air compressor.

(5) In the air compressor proposed in the embodiments of the present disclosure, the sealing ring 41 is arranged horizontally due to the elimination of the deflection angle, and can tightly fit against the inner wall of the cavity 31, so that the sealing effect is better, and the sealing ring 41 has a longer service life.

Figure 1:
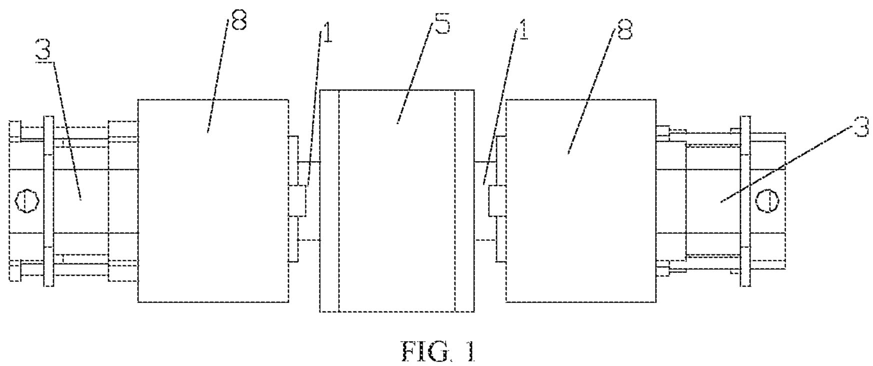
FIG. 1 is an overall view of an air compressor according to an embodiment of the present disclosure.

Reference numerals in drawings: 1, Rotating Shaft: 11, Limiting Rail: 2, Transmission Body: 21, Transmission Member: 211, First Rolling Member: 212, Connecting Base: 22, Cavity: 23, Passage: 3, Body: 31, Cavity: 32, First Air Passage: 33, Second Air Passage: 4, Piston: 41, Sealing Ring: 5, Driving Mechanism: 52, Reduction Box: 51, Driving Member: 6, Fastener: 61, Hoop Body: 62, Pressure Plate: 63, Engaging Groove: 7, Guide Assembly: 71, First Guide Member; 72, Second Guide Member: 8, Transmission Housing.

DETAILED DESCRIPTION OF THE EMBODIMENTS

In order to further make the content of the present disclosure more understandable, the present disclosure will be described in detail with reference to the accompanying drawings and embodiments.

The present disclosure will be further described in detail below in conjunction with the accompanying drawings and embodiments. It can be understood that the specific embodiments described herein are only used to illustrate the relevant contents of the present disclosure, but not to limit the present disclosure. It should also be noted that, for convenience of description, only the parts related to the present disclosure are shown in the drawings. The terms “first”, “second” etc. described in the present disclosure are provided for the convenience of describing the technical scheme of the present disclosure, and have no specific limiting effect, which are all generic and do not limit the technical scheme of the present disclosure. It should be noted that, as long as there is no conflict, the embodiments and features in the embodiments of the present disclosure can be combined with each other. In the description of the present disclosure, it should be noted that the orientation or positional relationships indicated by terms “center”, “upper”, “lower”, “left”, “right”, “vertical”, “horizontal”, “inner”, “outer”, etc. are based on the orientation or positional relationships shown in the drawings. They are provided only for the convenience of describing the present disclosure and simplifying the description, and do not indicate or imply that a device or an element indicated must have a specific orientation or be constructed and operated in a specific orientation, and therefore should not be construed as limitations of the present disclosure. Furthermore, the terms “first”, “second” and “third” are used for descriptive purposes only and are not to be construed as indicating or implying relative importance. Unless otherwise clearly stated and defined, the terms “mounting”, “coupling” and “connecting” should be understood in a broad sense. For example, it may be a fixed connection, a detachable connection, or an integral connection; or may be a mechanical connection, or an electrical connection; or may be a direct connection, or an indirect connection through an intermediate medium; or may be an internal connection between two components. For those of ordinary skill in the art, the specific meanings of the above terms in the present disclosure can be understood depending on circumstances. Multiple technical schemes in the same embodiment, as well as multiple technical schemes in different embodiments, can be arranged and combined to form new technical schemes without contradiction or conflict, which all fall within the scope of protection claimed by the present disclosure.

Embodiment 1

Figure 2:
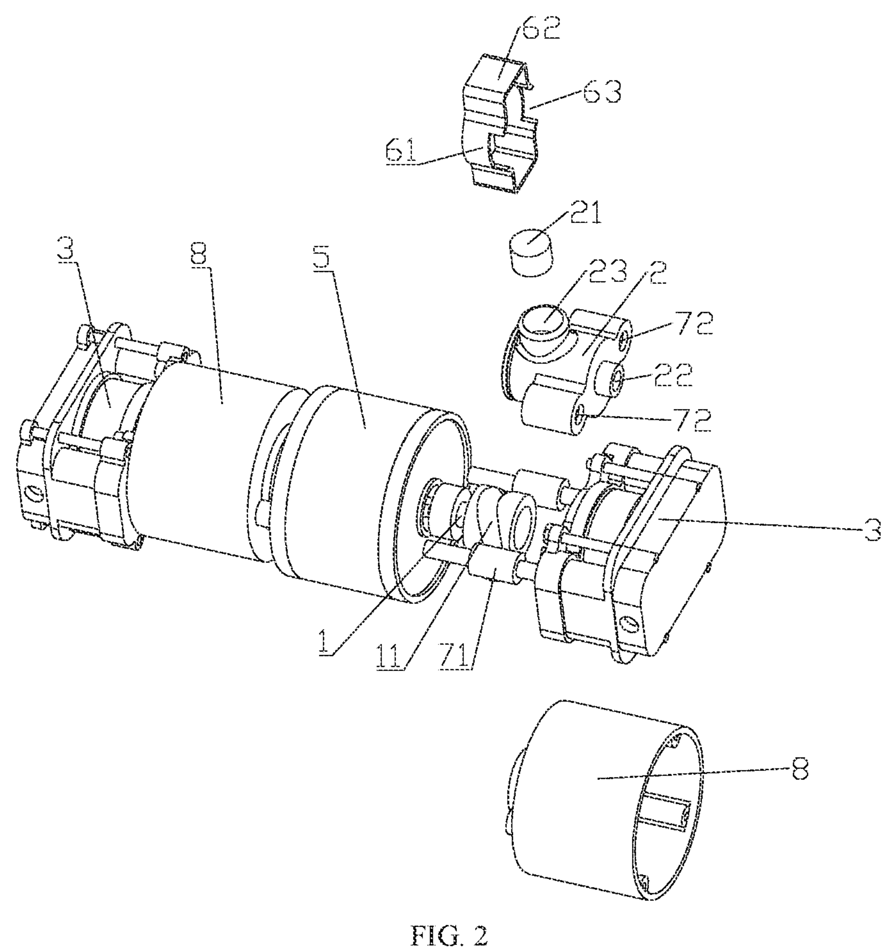
FIG. 2 is an exploded view of an air compressor according to an embodiment of the present disclosure.
Figure 3:
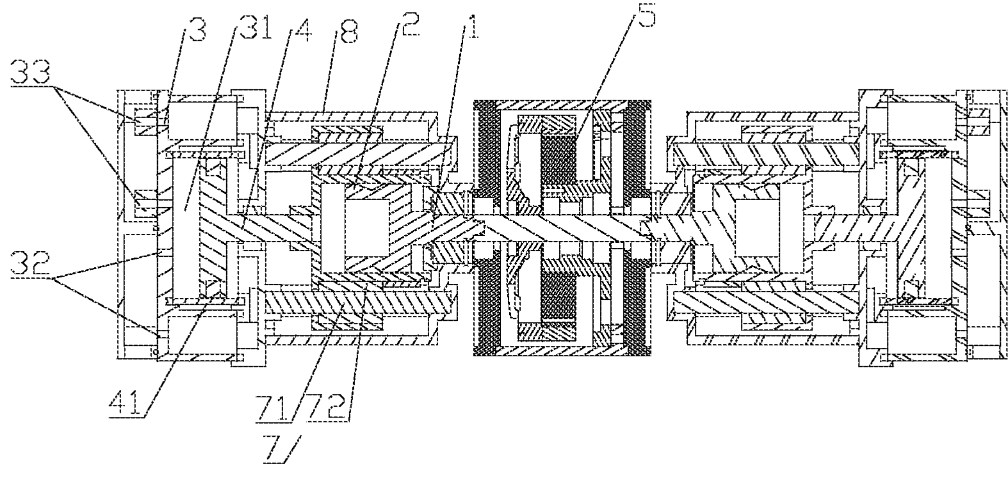
FIG. 3 is a cross-sectional view of an air compressor according to an embodiment of the present disclosure.
Figure 4:
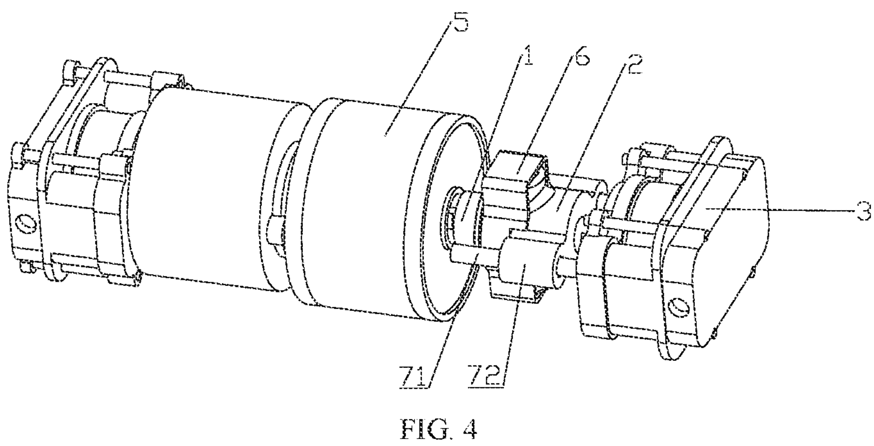
FIG. 4 is a schematic view showing a fit between a fastener and a transmission body of a transmission structure according to an embodiment of the present disclosure.
Figure 5:
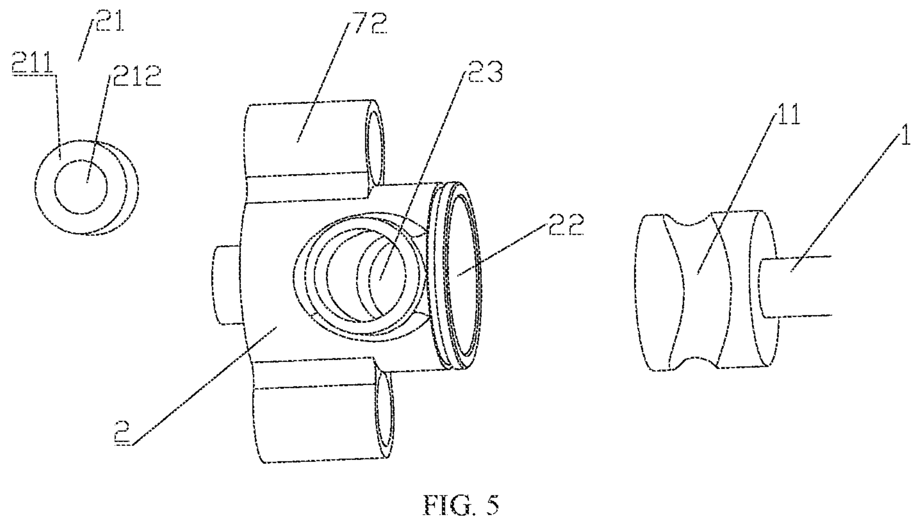
FIG. 5 is a schematic view of a transmission body and a limiting rail of the transmission structure according to an embodiment of the present disclosure.
Figure 6:
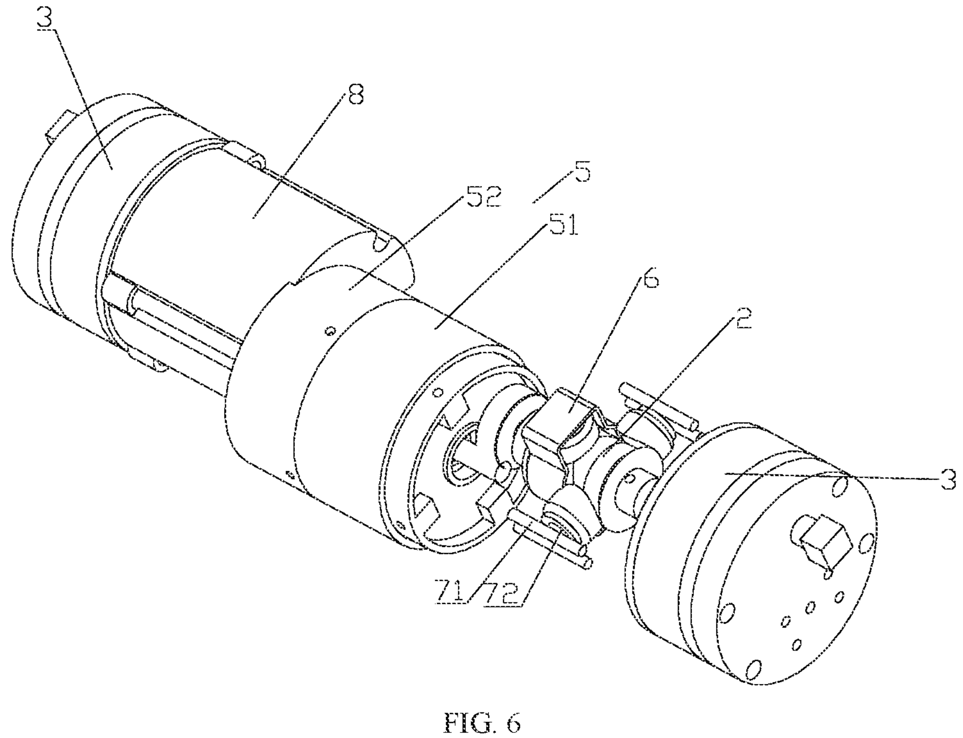
FIG. 6 is a schematic view showing a rolling fit between a first guide member and a second guide member of a transmission structure according to an embodiment of the present disclosure.

Referring to FIGS. 1 to 6, a transmission structure according to this embodiment includes a rotating shaft 1 and a transmission body 2. An end of the rotating shaft 1 is provided with a limiting rail 11, and another end of the rotating shaft 1 is configured to be connected to a driving mechanism 5. A first end of the transmission body 2 movably cooperates with the limiting rail 11 so that when the rotating shaft 1 rotates, the transmission body 2 reciprocates along an axis of the rotating shaft 1 under the limit of the limiting rail 11. A second end of the transmission body 2 is configured to be connected to a device that requires linear reciprocation to do work. The driving mechanism 5 drives the rotating shaft 1 to rotate. When the rotating shaft 1 rotates, the transmission body 2 reciprocates along the axis of the rotating shaft 1 under the limit of the limiting rail 11, so that the device connected to the transmission body 2 reciprocates linearly to do work. As such, it is beneficial to reduce deflection force, reduce power loss and improve transmission efficiency. The transmission structure of this embodiment can be applied to various devices, such as compressors, cleaning machines, vibrators, mud pumps, spray painting devices and other devices that require linear reciprocation to do work.

Example 2

Referring to FIGS. 1 to 6, compared with the technical scheme of Embodiment 1, a transmission structure of this embodiment can be improved as follows: the first end of the transmission body 2 is symmetrically provided with transmission members 21: the limiting rail 11 extends in a circumferential direction of the rotating shaft 1: the limiting rail 11 extends reciprocally in the axial direction of the rotating shaft 1: and the transmission members 21 movably cooperate with the limiting rail 11. When the rotating shaft 1 rotates, the symmetrical arrangement enables the transmission members 21 to offset each other's deflection forces, thus driving the transmission body 2 to reciprocate along the axis of the rotating shaft 1. A plurality of pairs of transmission members 21 can be provided, and a plurality of limiting rails 11 that cooperate with the transmission members 21 can be provided. When a plurality of limiting rails 11 are provided, the multiple limiting rails 11 are divided into two groups, and each group includes a plurality of limiting rails 11. A group of limiting rails 11 is provided at an end of the reciprocating shaft. In the group of limiting rails 11, one of the limiting rails 11 rotates by a preset angle around the axis of the rotating shaft 1, and then coincides with another one of the limiting rails 11. A plane where connecting lines between the centers of the corresponding plurality of transmission members 21 are located is perpendicular to the axis of the rotating shaft 1. Another group of the limiting rails 11 is provided at the end of the rotating shaft 1. In this group of the limiting rails 11, the plurality of the limiting rails 11 are distributed in parallel and spaced apart, and the corresponding connecting lines between the centers of plurality of transmission members 21 are parallel to the axis of the rotating shaft 1.

The limiting rail 11 can be a limit sliding groove, a limiting tube, or other limiting structures. The transmission member 21 includes a first rolling member 211 and a connecting base 212. The first rolling member 211 is connected to the transmission body 2 through the connecting base 212. The first rolling member 211 is in rolling fit with the limiting rail 11. In this way, through the rolling fit, it is beneficial to reduce friction, reduce power loss, and improve the transmission efficiency of the linear reciprocating transmission structure.

The first rolling member 211 is a ball. The connecting base 212 is a fixed steel ball holder. The connecting base 212 is threadedly connected to the transmission body 2. Alternatively, the connecting base 212 is fixed in the transmission body 2 through a circlip. In this way, it is beneficial to improve the rolling smoothness of the first rolling member 211, further reducing the power loss, and improving the transmission efficiency of the transmission mechanism. Alternatively, the first rolling member 211 and the connecting base 212 are integrated universal ball or bull's-eye ball bearings. In this way, it is beneficial to improve the structural stability of the transmission member 21. Under the condition of ensuring the load, the universal ball or bull's-eye ball bearing forms rolling friction with the rotating shaft 1, which is beneficial to reduce power loss and improve transmission efficiency.

Embodiment 3

Referring to FIGS. 1 to 6, compared with the technical scheme of Embodiment 1 or 2, a transmission structure of this embodiment can be improved as follows: the transmission body 2 includes a cavity 22 through which the rotating shaft 1 extends and a passage 23 in which the transmission member 21 is placed. The passage 23 is in communication with the cavity 22. The transmission member 21 fits tightly into the passage 23. The top of the passage 23 is covered by a fastener 6. The fastener 6 firmly fixes the transmission member 21 in the passage 23 to ensure that the transmission member 21 drives the transmission body 2 to perform reciprocating linear motion. The fastener 6 includes a hoop body 61 and a pressure plate 62 connected to the hoop body 61. The hoop body 61 is fit over an outer surface of the transmission body 2, and the pressure plate 62 covers the top of the passage 23. The hoop body 61 and the pressure plate 62 are integrally formed to achieve a better fastening effect. In other embodiments, the hoop body 61 and the pressure plate 62 can be connected to each other by screws or welding.

Embodiment 4

Referring to FIGS. 1 to 6, compared with any of the technical schemes of Embodiments 1 to 3, a transmission structure of this embodiment can be improved as follows: a guide assembly 7 is further included. The guide assembly 7 includes a first guide member 71 and a second guide member 72 in sliding or rolling fit with the first guide member 71. The first guide member 71 is arranged parallel to the rotating shaft 1. The second guide member 72 is arranged on the transmission body 2. The hoop body 61 includes an engaging groove 63 cooperating with the second guide member 72. The transmission body 2 forms a guiding fit with the first guide member 71 by means of the second guide member 72, which avoids a large degree of trajectory deviation in the reciprocating motion of the transmission body 2, and is beneficial to improve the transmission efficiency of the transmission structure. The arrangement of the engaging groove 63 enhances the strong connection between the fastener 6 and the transmission body 2. In other embodiments, the fastener 6 may be provided with an engaging hole cooperating with the second guide member 72.

Embodiment 5

Referring to FIGS. 1 to 6, compared with any of the technical schemes of Embodiments 1 to 4, a transmission structure of this embodiment can be improved as follows: the first guide member 71 and the second guide member 72 are in sliding fit: and the first guide member 71 is a guide plate, a guide groove, or a guide tube. When the first guide member is a guide plate, the second guide member is a guide groove or guide tube that cooperates with the guide plate. When the second guide member is a guide plate, the first guide member is a guide groove or guide tube that cooperates with the guide plate. When the first guide member 71 or the second guide member 72 is a guide plate. A guide plate is a guide groove or guide tube matched with the guide plate. When the first guide member 71 or the second guide member 71 is a guide plate, the outer periphery of the first guide member 71 or the second guide member 71 can be covered by a wear-resistant pad to prevent the first guide member 71 or the second guide member 72 from being worn.

Embodiment 6

Referring to FIGS. 1 to 6, compared with any of the technical schemes of Embodiments 1 to 5, a transmission structure of this embodiment can be improved as follows: the first guide member 71 and the second guide member 72 are in rolling fit. The first guide member 71 is a slide rail, and the second guide member 72 is a ball that cooperates with the slide rail. The rolling fit forms rolling friction, which is beneficial to reduce power loss and improve transmission efficiency.

Embodiment 7

Referring to FIGS. 1 to 6, compared with any of the technical schemes of Embodiments 1 to 6, a transmission structure of this embodiment can be improved as follows: as shown in FIGS. 1 to 6, a transmission connection mechanism of this embodiment includes a mechanism body 3, a piston 4, and the transmission structure described in any of the technical schemes of Embodiments 1 to 5, the first guide member 71 is arranged on the mechanism body 3. A first end of the piston 4 is arranged inside the mechanism body 3, and a second end of the piston 4 is connected to the transmission body 2, so that the transmission body 2 drives the piston 4 to perform linear reciprocating motion inside the mechanism body 3. The linear reciprocating transmission structure further includes a transmission housing 8. The rotating shaft 1, the transmission body 2, the transmission members 21, and the fastener 6 are all arranged in the transmission housing 8. The transmission housing 8 is connected to the mechanism body 3 by a guide rail. In this way, the transmission housing 8 and the transmission connection mechanism form an integrated structure, which is beneficial to improve structural compactness and transmission efficiency.

Embodiment 8

Referring to FIGS. 1 to 6, an air compressor of this embodiment includes a driving mechanism 5 and a transmission connection mechanism of the technical scheme described in Embodiment 8. One or more transmission connection mechanisms are provided. The driving mechanism 5 drives one or more rotating shafts 1 to rotate. The mechanism body 3 is provided with a cavity 31, a first air passage 32, and a second air passage 33. The first air passage 32 and the second air passage 33 are both in communication with the cavity 31. The second end of the piston 4 is connected to the transmission body 2, and the first end of the piston 4 is in sliding fit with the cavity 31, so that the piston 4 draws air into the cavity 31 from the first air passage 32, and discharges the air in the cavity 31 via the second air passage 33.

The driving mechanism 5 drives the rotating shaft 1 to rotate. When the rotating shaft 1 rotates, the transmission body 2 reciprocates along the axis of the rotating shaft 1 under the limit of the limiting rail 11, so that the piston 4 connected to the transmission body 2 reciprocates linearly to do work. The first air passage 32 is provided with a first valve and a second valve. The second air passage is provided with a third valve and a fourth valve. When the piston 4 moves in a direction approaching the rotating shaft 1, the piston 4 draws the air into the cavity 31 from the first valve of the first air passage 32 and discharges the air in the cavity 31 via the third valve of the second air passage 33. When the piston 4 moves in the direction away from the rotating shaft 1, the piston 4 draws the air into the cavity 31 from the second valve of the first air passage 32 and discharges the air in the cavity 31 via the fourth valve of the second air passage 33. There is no deflection force during the reciprocating process of the piston 4, and the piston 4 does works back and forth in both directions, reducing power loss, improving transmission efficiency, and achieving bidirectional work. In addition, a plurality of bodies 3 can reciprocate to do work along the axis of the rotating shaft 1 at the same time, increasing the working efficiency of the air compressor. The shape of the mechanism body 3 is not limited by the present disclosure. The mechanism body 3 can be designed to have a specific shape required by the user according to the needs of the process.

Embodiment 9

Referring to FIGS. 1 to 6, compared with the technical scheme of Embodiment 8, an air compressor of this embodiment can be improved as follows: the piston 4 is provided with a sealing ring 41 fit over the out periphery of the piston 4. The sealing ring 41 fits tightly against the inner wall of the cavity 31. The sealing ring 41 is configured to prevent the piston from being seized during the reciprocating motion, and to reduce wear. In the prior art, due to the existence of the deflection angle of the crank structure, the piston also deflects during the reciprocating linear motion, and the sealing ring life is not long. The sealing ring 41 in this embodiment is arranged horizontally due to the elimination of the deflection angle, and can tightly fit against the inner wall of the cavity 31, so that the sealing effect is better, and the sealing ring 41 has a longer service life.

Embodiment 10

Referring to FIGS. 1 to 6, compared with the technical scheme of Embodiment 8 or 9, an air compressor of this embodiment can be improved as follows: the driving mechanism 5 includes a reduction box 52 and a driving member 51. The driving member 51 is drivingly connected to the reduction box 52. The reduction box 52 is connected to the rotating shaft 1. The driving member 51 drives the reduction box 52 to move, thereby driving the rotating shaft 1 to rotate, which is beneficial to adjust the rotation speed of the rotating shaft 1, thereby adjusting the moving speed of the piston 4, and adjusting the air pressure and flow rate of the air compressor, which is beneficial to improve the stability and quality of use of the air compressor. The driving member 51 can be a motor, which is beneficial to improve the portability of the driving member 51. A transmission can be provided between the driving member 51 and the reduction box 52. The driving member 51 drives the transmission to move, thereby driving the reduction box 52 to move, which is beneficial to improve the driving effect of the driving member 51 and the service life of the driving member 51. In other embodiments, the driving mechanism 5 can be directly the driving member 51 without the need for a reduction box 52.

The present disclosure and its embodiments are schematically described above. The above description has no limiting sense. The drawings only illustrate one of the embodiments of the present disclosure, and the actual structure is not limited thereto. Therefore, if inspired by the present disclosure, a person of ordinary skill in the art can devise structural means and embodiments similar to the above technical schemes without creative effort, without departing from the spirit of the present disclosure, they shall all fall within the protection scope of the present disclosure.

The invention claimed is:

1. A transmission structure, comprising a rotating shaft and a transmission body, wherein an end of the rotating shaft is provided with a limiting rail, and another end of the rotating shaft is configured to be connected to a driving mechanism, wherein a first end of the transmission body movably cooperates with the limiting rail so that when the rotating shaft rotates, the transmission body reciprocates along an axis of the rotating shaft under limit of the limiting rail, and a second end of the transmission body is configured to be connected to a device that requires linear reciprocation to do work;

wherein the first end of the transmission body is symmetrically provided with transmission members; the limiting rail extends in a circumferential direction of the rotating shaft; the limiting rail extends reciprocally in an axial direction of the rotating shaft; and the transmission members movably cooperate with the limiting rail;

the transmission body comprises a cavity through which the rotating shaft extends and a passage in which the transmission member is placed, and wherein the passage is in communication with the cavity, and wherein the transmission member is fit tightly into the passage, a top of the passage is covered by a fastener comprising a hoop body and a pressure plate connected to the hoop body, and wherein the hoop body is fit over an outer surface of the transmission body, and the pressure plate covers the top of the passage; and further comprising a guide assembly comprising a first guide member and a second guide member in sliding or rolling fit with the first guide member, wherein the first guide member is arranged parallel to the rotating shaft, the second guide member is arranged on the transmission body, and the hoop body comprises an engaging groove or an engaging hole cooperating with the second guide member.

2. The transmission structure according to claim 1, wherein the first guide member and the second guide member are in sliding fit; and the first guide member is a guide plate, a guide groove, or a guide tube, and wherein when the first guide member is a guide plate, the second guide member is a guide groove or guide tube that cooperates with the guide plate, and when the second guide member is a guide plate, the first guide member is a guide groove or guide tube that cooperates with the guide plate.

3. The transmission structure according to claim 1, wherein the first guide member and the second guide member are in rolling fit; the first guide member is a slide rail, and the second guide member is a ball that cooperates with the slide rail.

4. A transmission connection mechanism, comprising:

a mechanism body;

a piston; and the transmission structure according to claim 1, wherein the first guide member is arranged on the mechanism body, a first end of the piston is arranged inside the mechanism body, and a second end of the piston is connected to the transmission body, so that the transmission body drives the piston to perform linear reciprocating motion inside the mechanism body.

5. An air compressor, comprising:

a driving mechanism; and the transmission connection mechanism according to claim 4, wherein one or more transmission connection mechanisms are provided; the driving mechanism drives one or more rotating shafts to rotate; the mechanism body is provided with a cavity, a first air passage, and a second air passage, and wherein the first air passage and the second air passage are in communication with the cavity, and wherein the second end of the piston is connected to the transmission body, and the first end of the piston is in sliding fit with the cavity, so that the piston draws air into the cavity from the first air passage, and discharges the air in the cavity via the second air passage.

6. The air compressor according to claim 5, wherein the piston is provided with a sealing ring fit over an outer periphery of the piston, and the sealing ring fits tightly against an inner wall of the cavity.

7. The air compressor according to claim 5, wherein the driving mechanism comprises a reduction box and a driving member, and wherein the driving member is drivingly connected to the reduction box, and the reduction box is connected to the rotating shaft.

* * * * *